SPICE EXTRACT

This invention relates to a process for the production of an aromatic spice extract.

There are so many different processes for producing aromatic extracts that a particular terminology has been created for designating these extracts according to the nature of the processes by which they are obtained. For example, an extract produced by stripping the starting material with steam is known as an "essential oil"; an extract produced by a simple squeezing operatin, i.e. an operation in which the material is squeezed to extract its goodness or juice is known as "essence"; extracts obtained by treating fresh vegetable materials with organic solvents are known as "concrete essences" or "absolute essences" after extraction with ethanol. Finally, the terms "resinoids" or "oleoresins" are reserved for the extracts obtained by treating dried vegetable materials or spices with organic solvents.

Although some of these techniques are ill-suited to spices, others are commonly used, especially the solvent techniques. For example, French Patent Application No. 2,192,852 describes a process for extracting flavours and fragrances from a vegetable material by treatment with one or more organic solvents.

In addition, there are processes for capturing the highly volatile fractions of the spice, such as those which are given off during grinding. One such process is described for example in U.S. Pat. No. 3,314,802.

Although it is indisputable that most of the aromatic extracts obtained by one or other of these processes are of good quality, the fact remains that they do not entirely reproduce the natural aroma of the spice in all its richness and completeness.

By contrast, aromatic extracts of an exceptional quality which is superior to that of the spice extracts normally found on the market are obtained by the present invention. The present invention provides a process for the production of an aromatic spice extract, which comprises (a) grinding a spice and collecting an aromatic fraction A consisting of the gases given off during grinding, (b) treating the spice with an apolar organic solvent so as to obtain an aromatic fraction B contained in this apolar solvent, and (c) treating the spice with at least one polar solvent so as to obtain an aromatic fraction C contained in this polar solvent, the combination of the aromatic fractions A, B and C constituting the aromatic spice extract.

It has been found that the combination of the gases given off during grinding with an aromatic fraction obtained by treatment with an apolar solvent and an aromatic fraction obtained by treatment with a polar solvent produces a very considerable improvement in regard to aromatic quality.

The above distinction between fractions A, B and C is made solely in the interest of convenience of the description and is not meant in any way to imply that these fractions have to be separately produced. For example, in one embodiment of the process, the spice obtained after grinding is directly treated with a mixture of an apolar solvent and at least one polar solvent, one advantageous variant of this embodiment consisting in the use of an azeotropic mixture.

In addition, it is pointed out that the expression "the combination of the aromatic fractions A, B and C constituting the aromatic spice extracts" should not necessarily be interpreted as implying a complete combination. On the contrary, the fractions in question, where they have obviously been separately produced, may if desired only be partly recombined so as to act on the organoleptic equilibrium of the aromatic spice extract obtained.

In the context of the invention, apolar organic solvents are the organic liquids commonly designated as such by the chemist. This category includes in particular hydrocarbons or mixtures of hydrocarbons, such as pentane, hexane, cyclohexane, cyclohexene and petroleum ethers.

So far as the expression "polar organic solvents" is concerned, it is advisable to interpret it in relative terms and to consider that the solvents covered by this definition are those of which the polarity is distinctly higher than that of the solvents belonging to the category mentioned in the preceding paragraph. In the context of the invention, polar organic solvents are, for example, the Freons (chlorofluoroalkanes), methylene chloride, trichloroethylene, acetone, ethylacetate, methanol, ethanol, isopropanol, n-propanol. These solvents may be used individually, in admixture with one another or even in admixture with other liquids, such as water for example. In the latter case, the azeotropic mixture may be a ternary mixture for example. Numerous binary and ternary azeotropic mixtures are set out by way of example in the following Table:

| AZEOTROPIC MIXTURES AND RELATIVE COMPOSITIONS (% BY WEIGHT) | Bp IN °C. (760 mm Hg) |
| --- | --- |
| pentane/acetone 21:79 | 32 |
| pentane/methylene chloride 50:50 | 30 |
| hexane/acetone 41:59 | 49.8 |
| hexane/isopropanol 22:78 | 61 |
| hexane/ethanol 79:21 | 58.7 |
| hexane/ethanol/water 85:12:3 | 56 |
| hexane/isopropanol/water 71:11.5:7.5 | 66.1 |
| cyclohexane/acetone/methanol 40.5:43.5:16 | 51.5 |
| cyclohexane/ethanol/water 76:17:7 | 62.5 |
| cyclohexane/n-propanol/water 81.5:10:8.5 | 66.5 |
| cyclohexene/ethanol/water 73:20:7 | 64.1 |

In general, the apolar and polar solvents are selected from the solvents having a boiling point which enables them to be readily eliminated without any excessive increase in temperature, or even from the solvents capable of forming azeotropic mixtures having a boiling point of this order.

In a first embodiment of the process according to the invention, a spice or a mixture of spices selected, for example, from cardamom, caraway, coriander, cumin, curcuma, cloves, laurel, nutmeg, paprika, pimentoes, chillies and pepper, is finely ground at a low temperature of the order of $-40°$ C. (a dry grinding). The grinding gases are liberated by heating the powder to around 20° C. and are entrained by passing a gentle stream of inert gas, preferably under reduced pressure, over the powder for a period ranging, for example, from 2 to 12 hours. They are condensed in cold traps kept at a temperature of $-80°$ C. The condensate obtained, which represents from 1 to 6% by weight of the ground spice, constitutes the aromatic fraction A. The powder is then treated by conventional solid-liquid extraction at 15° to 35° C. with an apolar solvent, for

United States Patent [19]

Chiovini et al.

[11] 4,158,708

[45] Jun. 19, 1979

[54] SPICE EXTRACT

[75] Inventors: Jacky Chiovini, Ecublens; Jean-Paul Marion, Mollie-Margot; Siegfried Adamer, Lausanne, all of Switzerland

[73] Assignee: Societe d'Assistance Technique pour Produits Nestle S.A., Lausanne, Switzerland

[21] Appl. No.: 774,640

[22] Filed: Mar. 4, 1977

[30] Foreign Application Priority Data

Mar. 9, 1976 [CH] Switzerland .................. 2896/76

[51] Int. Cl.² ........................................ A23L 1/221
[52] U.S. Cl. ............................. 426/650; 426/651; 426/655; 426/386; 426/429; 426/430
[58] Field of Search .............. 426/651, 655, 386, 429, 426/430, 431, 478, 518, 312

[56] References Cited

U.S. PATENT DOCUMENTS

| 2,134,308 | 10/1938 | Stange | 426/655 X |
| 3,314,802 | 4/1967 | Cohodas | 426/518 |
| 3,340,250 | 9/1967 | Sair et al. | 426/429 X |
| 3,765,904 | 10/1973 | Roissart et al. | 426/386 X |
| 3,878,195 | 4/1975 | Taillie et al. | 426/430 X |

FOREIGN PATENT DOCUMENTS

| 2055030 | 5/1972 | Fed. Rep. of Germany | 426/429 |
| 2327477 | 12/1974 | Fed. Rep. of Germany | 426/655 |
| 2192852 | 2/1974 | France. | |
| 1419958 | 12/1975 | United Kingdom. | |

OTHER PUBLICATIONS

Merory, *Food Flavorings, Composition, Manufacture and Use,* The AVI Publishing Co., Inc., (1960), Westport, Conn., pp. 101, 102, 148, 149.

*Primary Examiner*—Raymond N. Jones
*Assistant Examiner*—Esther M. Kepplinger
*Attorney, Agent, or Firm*—Watson, Leavenworth, Kelton & Taggart

[57] ABSTRACT

A process for the production of an aromatic spice extract, which comprises (a) grinding a spice and collecting an aromatic fraction A, consisting of the gases given off during grinding, (b) treating the spice with an apolar organic solvent so as to obtain an aromatic fraction B contained in this apolar solvent, and (c) treating the spice with at least one polar solvent so as to obtain an aromatic fraction C contained in this polar solvent, the combination of the aromatic fractions A, B and C constituting the aromatic spice extract.

The polar and apolar organic solvents may be used in mixture, especially in azeotropic mixture.

20 Claims, No Drawings

| EXAMPLES | SPICE TREATED | First part GRINDING GAS (FRACTION A) | APOLAR SOLVENT | FRACTION B AND % SOLIDS |
| --- | --- | --- | --- | --- |
| 1 (recap) | 350 kg nutmeg | 6.2 kg | petroleum ether 40 – 60 | 63.7 kg 78% |
| 2 | 9 kg paprika | 103 g with water | pentane | 1338 g 61.5% |
| 3 | 4.7 kg cardamom | 128 g | hexane | 316 g 30.3% |
| 4 | 4.9 kg cloves | 65 g | petroleum ether 40 – 60 | 620 g 19.5% |
| 5 | 4.4 kg coriander | 0.84 kg | petroleum ether 40 – 60 | 0.227 kg 38.8% |
| 6 | 97 kg black pepper | 0.17 kg | petroleum ether 40 – 60 | 1.91 kg 56.7% |
| 7 | 80 kg cumin (*Cuminum cyminum*) | 0.9 kg | petroleum ether 40 – 60 | 3.1 kg 11.3% |

| EXAMPLES | POLAR SOLVENT | Second part FRACTION C AND % SOLIDS | AROMATIC EXTRACT AND % SOLIDS | OLEORESIN (ACCORDING TO VARIANT) |
| --- | --- | --- | --- | --- |
| 1 | ethanol | 28.0 kg 50% | 97.9 kg 71.4% | 69.9 kg reddish-yellow-wax-like mass |
| 2 | ethanol | 2221 g 23.4% | 3662 g 36.7% | 1344 g highly viscous red-black oil |
| 3 | ethanol | 1096 g 10.8% | 1540 g 22.3% | 343 g highly fluid brown oil with yellowish precipitate |
| 4 | ethanol | 1226 g 18.4% | 1911 g 26.5% | 506 g brownish oil with brownish precipitate |
| 5 | ethanol | 0.876 kg 4.5% | 11.87 kg 17.8% | 2.113 kg clear yellow oil with flaky, darker precipitate |
| 6 | ethanol | 10.25 kg 25.9% | 12.33 kg 30.6% | 3.77 kg greenish-brown precipitate with blackish supernatant oil |
| 7 | ethanol | 8.51 kg 13.3% | 12.5 kg 12% | 1.5 kg brown oil with solid yellow suspension |

Results of Tasting Tests and Comparison Tests

The aromatic extracts are submitted to the appreciation of a panel of six trained tasters either on a neutral base (consisting of an 80 g/l solution of sodium glutamate 7.1%, cooking salt 7.1%, potato starch 7.1%, powdered milk 24.2%, flour 34.3% and Biscuitine C 20.2%) in a quantity of 0.05 g/100 ml, or in an edible material.

The extract of Example 1 (nutmeg) on the neutral base was found to be powerful and full-bodies. Four tasters preferred it to a comparable extract, but freed from the grinding gases. It was recommended as a flavouring agent for a mashed potato in a quantity of 0.07 to 1.5 g/kg of puree.

The extract of Example 2 (paprika) on the neutral base was qualified as having a "good taste of paprika".

The extract of Example 3 (cardamom) was recommended as a flavouring agent for a mayonnaise in a quantity of 1 to 20 g/kg of mayonnaise.

The extract of Example 6 (black pepper) on the neutral base was found to be very intense and highly aromatic. Five tasters preferred it to a comparable extract, but freed from the grinding gases (extract qualified as weak).

The extract of Example 7 (cumin) on the neutral base was judged to be round, fruity and agreeable. Five tasters preferred it to a comparable extract, but freed from the grinding gases. It may be used as a flavouring agent for butter in a quantity of 13 to 20 g/kg of butter.

The aromatic extracts of Examples 1, 6 and 7 were then compared with corresponding reference extracts obtained by the process described in French Patent Application No. 2,192,852 mentioned at the beginning of the description using the following solvents: Freon, then petroleum ether/acetone.

Four tasters preferred the extract of Example 1 (nutmeg) to the corresponding reference. Five tasters preferred the extract of Example 6 (black pepper) to the corresponding reference. Finally, the six tasters preferred the extract of Example 7 (cumin) to the corresponding reference.

EXAMPLES 8 to 11

The procedure described in Example 1 is repeated to obtain the grinding gases. By contrast, the powder obtained is only treated with one solvent, an azeotropic mixture. The desired aromatic extract is obtained by combining the grinding gases and the product obtained by extraction of the ground spice with the azeotropic mixture after partial concentration, as described in Example 1. The oleoresins are obtained in accordance with the variant of that Example. The results obtained are as follows:

| EXAMPLES | SPICE TREATED AND WEIGHT | GRINDING GAS | AZEOTROPIC MIXTURE (% BY WEIGHT AND B.P.) | PRODUCT OF EXTRACTION AFTER PARTIAL CONCENTRATION | OLEORESIN (ACCORDING TO VARIANT) |
|---|---|---|---|---|---|
| 8 | 4.5 kg cumin (Cuminum cyminum) | 4.5 kg | hexane 85% ethanol 12.5% water 2.5% 56° C. | 1112 g 60.2% | 684 g |
| 9 | 4 kg caraway (Carum carvi) | 17.5 g | hexane 85% ethanol 12.5% water 2.5% 56° C. | 908 g 26% | 540 g |
| 10 | 1 kg black pepper | 1.2 g | hexane 21% ethanol 79% 59° C. | 213 g 31.4% | 75 g |
| 11 | 2.5 kg black pepper | 11.4 g | hexane 85% ethanol 12.5% water 2.5% 56° C. | 603 g 32.5% | 265 g |

Results of Tasting Tests and Comparison Tests

The extract of Example 8 (cumin) on the neutral base was found to be fresh and good. It was preferred by five tasters to a similar extract, but without the grinding gases.

The extract of Example 11 (black pepper) on the neutral base was found to be green and fresh, intense. It was preferred by five tasters to a similar extract, but without the grinding gases.

EXAMPLE 12

A trigonal mill (Siefer type SM 180) is filled with freshly rectified hexane to remove the air from the grinding chamber, after which the mill is switched on and is fed with black pepper so as to obtain a suspension containing around 200 g of pepper per liter of hexane. After 10 minutes' operation, the mill is stopped, after which the grounds are separated and the liquid fraction recovered for concentration under reduced pressure. The grounds are then introduced into an extraction tank and are treated with fresh hexane under the same conditions as in Example 1. The same operations are then repeated for the treatment with ethanol of the grounds obtained.

The combination of the various liquid phases obtained consititutes the required aromatic extract. From 90 to 110 g of this extract are obtained for 1 kg of black pepper. This extract is judged by the tasters to be green, fresh and intense.

EXAMPLE 13

Black peper is wet ground in the same way as described in Example 12. Hexane is again used as solvent.

In contrast to Example 12, the grounds obtained are not successively treated with fresh hexane and ethanol, but are directly treated with an azeotropic mixture of hexane (21%) and ethanol (79%).

The various liquid phases obtained are then combined to give the required aromatic extract. Once again, from 90 to 110 g of extract are obtained for 1 kg of black pepper.

EXAMPLE 14

An aromatic extract of nutmeg is prepared in accordance with the general directions of Example 1. 1.25 kg of nutmeg gives 34 g of fraction A, 540 g of fraction B with a dry matter content of 40% and 302 g of fraction C with a dry matter content of 44%. Fraction C is then added to 4.65 kg of cooking salt and the mixture is treated in a Buchi rotary evaporator for 30 minutes at 30° C. under 50 to 100 mm Hg. Fraction B is added to the product obtained and the evaporator is started up again for 30 minutes under 50 to 200 mm Hg at a temperature below 30° C. Finally, fraction A is added to the product obtained and the mixture is homogenised simply by switching on the evaporator for 10 minutes at normal temperature and pressure.

Approximately 5 kg of oleoresin of nutmeg fixed to a salt support are thus obtained, this extract being in the form of a very pale yellow-orange, highly odoriferous crystalline powder.

An excellent instant mashed potato is prepared by using 1 kg of standard commercial-grade potato flakes, 0.2 liter of milk, 50 g of butter, 20 g of salt and 1.4 g of the oleoresin on a salt support described above.

EXAMPLE 15

The procedure described in Example 14 is adopted to obtain 5 kg of oleoresin of black pepper on malto-dextrin. The ingredients used for this purpose were, on the one hand, 4.83 kg of malto-dextrin and, on the other hand, 29 g of a fraction A, 268 g of a fraction B with a dry matter content of 32% and 157 g of a fraction C with a dry matter content of 34% obtained from 1.5 kg of black pepper in accordance with Example 6.

We claim:

1. A process for the production of an aromatic spice extract, which comprises:
   (a) grinding a spice at low temperature, increasing the temperature of the ground spice to liberate an aromatic fraction A consisting of grinding gases, entraining the grinding gases by a stream of inert gas and collecting the aromatic fraction A by condensation,
   (b) treating the ground spice with an apolar organic solvent so as to obtain an aromatic fraction B contained in this apolar solvent,
   (c) treating the ground spice with at least one polar solvent so as to obtain an aromatic fraction C contained in this polar solvent, and
   (d) combining aromatic fractions A, B and C to produce the aromatic spice extract.

2. A process as claimed in claim 1, wherein the ground spice is treated with a mixture of the apolar organic solvent of (b) and at least one polar organic solvent of (c).

3. A process as claimed in claim 2, wherein the mixture is an azeotropic mixture.

4. A process for the production of an aromatic spice extract, which comprises:
   (a) grinding a spice in the presence of an apolar organic solvent and collecting an aromatic fraction A in the liquid phase consisting of the gases given off during grinding,
   (b) treating the ground spice with an apolar organic solvent so as to obtain an aromatic fraction B contained in this apolar solvent,
   (c) treating the grounds obtained with a polar organic solvent so as to obtain an aromatic fraction C contained in this polar solvents, and
   (d) combining aromatic fractions A, B and C to produce the aromatic spice extract,
   the solvents referred to in (a) and (b) being identical or different.

5. A process as claimed in claim 4, wherein the ground spice is treated with a mixture of the apolar organic solvent of (b) and at least one polar organic solvent of (c).

6. A process as claimed in claim 5, wherein the mixture is an azeotropic mixture.

7. A process as claimed in claim 1, wherein the apolar organic solvent is one of the following solvents: pentane, hexane, cyclohexane, cyclohexene, petroleum ethers.

8. A process as claimed in claim 4, wherein the apolar organic solvent is one of the following solvents: pentane, hexane, cyclohexane, cyclohexene, petroleum ethers.

9. A process as claimed in claim 1, wherein the polar organic solvent is one of the following solvents: a chlorofluoroalkane, methylene chloride, trichlorethylene, acetone, ethylacetate, methanol, ethanol, isopropanol, n-propanol.

10. A process as claimed in claim 3, wherein the azeotropic mixture is formed by solvents selected from the following: pentane, hexane, cyclohexane, cyclohexene, petroleum ethers, chlorofluoralkanes, methylene chloride, trichlorethylene, acetone, ethylacetate, methanol, ethanol, isopropanol, n-propanol and water.

11. A process as claimed in claim 6, wherein the azeotropic mixture is formed by solvent selected from the following: pentane, hexane, cyclohexane, cyclohexene, petroleum ethers, chlorofluoralkanes, methylene chloride, trichlorethylene, acetone, ethylacetate, methanol, ethanol, isopropanol, n-propanol and water.

12. A process as claimed in claim 1, wherein partial amounts of aromatic fractions A, B and C obtained are combined.

13. An aromatic spice extract when obtained by a process as claimed in claim 1.

14. A flavouring process which comprises using an aromatic spice extract as claimed in claim 13 as flavouring agent or as a flavour-reinforcing agent.

15. A flavouring process as claimed in claim 14 wherein the aromatic extract is fixed to a flavour carrier.

16. A process as claimed in claim 4, wherein the polar organic solvent is one of the following solvents: a chlorofluoroalkane, methylene chloride, trichlorethylene, acetone, ethylacetate, methanol, ethanol, isopropanol, n-propanol.

17. A process as claimed in claim 4, wherein partial amounts of aromatic fractions A, B and C obtained are combined.

18. An aromatic spice extract when obtained by a process as claimed in claim 4.

19. A flavoring process which comprises using an aromatic spice extract as claimed in claim 18 as a flavoring agent or as a flavor-reinforcing agent.

20. A flavoring process as claimed in claim 19 wherein the aromatic extract is fixed to a flavor carrier.

UNITED STATES PATENT AND TRADEMARK OFFICE
CERTIFICATE OF CORRECTION

PATENT NO. : 4,158,708
DATED : June 19, 1979
INVENTOR(S) : Jacky Chiovini, Jean-Paul Marion and Siegfried Adamer It is certified that error appears in the above–identified patent and that said Letters Patent are hereby corrected as shown below:

Col. 2, line 16, "solvents" should read -- solvent --.

Col. 2, line 58, the word "a", appearing before the phrase "dry grinding", should be deleted.

Col. 4, line 4, "know" should read -- known --.

Col. 4, line 41, "operation" should read --operations --.

Col. 5, line 58, "full-bodies" should read -- full-bodied --.

In the Table at Col. 7, under the heading "GRINDING GAS", the first entry thereunder "4.5 kg" should read -- 4.5 g --.

In Claim 4, at Col. 9, line 38, "solvents" should read -- solvent --.

Signed and Sealed this

Twenty-fifth Day of December 1979

[SEAL]

Attest:

SIDNEY A. DIAMOND

Attesting Officer   Commissioner of Patents and Trademarks